Sept. 10, 1929.　　　F. E. COFFEY　　　1,727,395
VENDING CART
Filed May 11, 1926　　　2 Sheets-Sheet 1

INVENTOR.
Frances E. Coffey
BY
ATTORNEY.

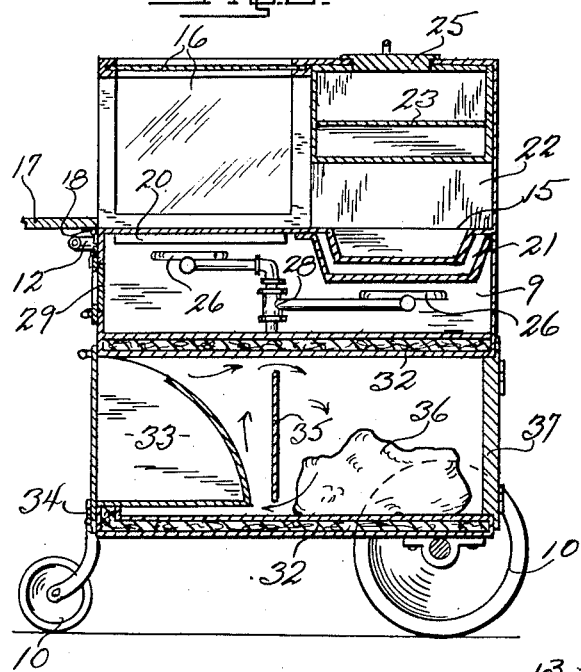
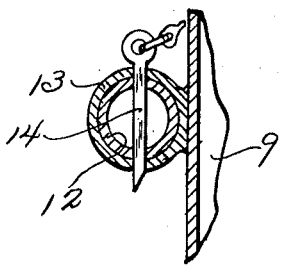
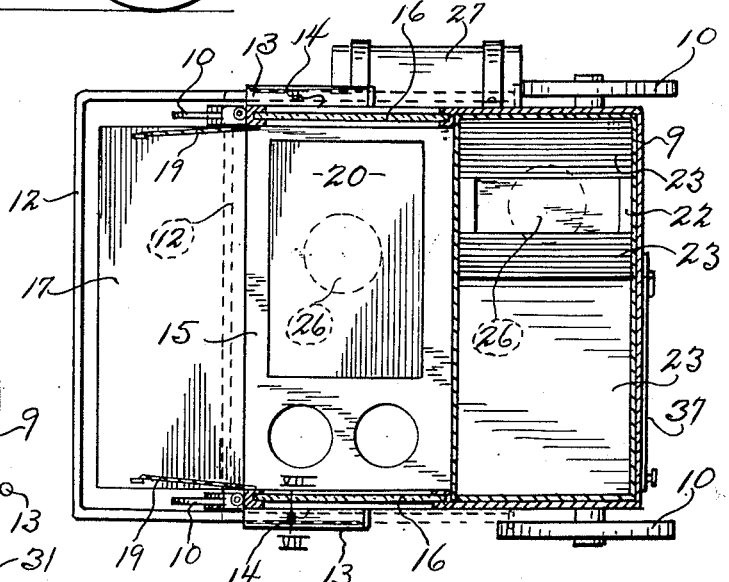
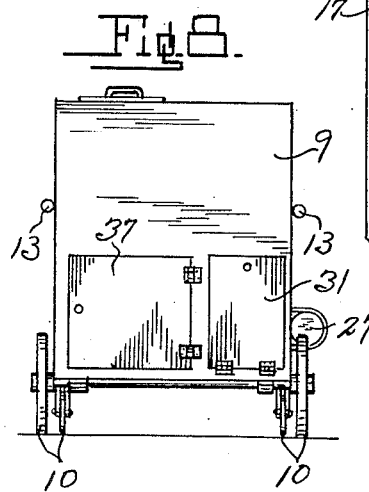

Patented Sept. 10, 1929.

1,727,395

UNITED STATES PATENT OFFICE

FRANCES E. COFFEY, OF KANSAS CITY, MISSOURI.

VENDING CART.

Application filed May 11, 1926. Serial No. 108,238.

This invention relates to food vending carts, and particularly to a cart adapted to be wheeled about from place to place and carry a supply of raw materials to be prepared and sold in the form of sandwiches or the like.

One of the primary objects of this invention is the provision of a vending cart which is equipped with an ice box, a cooking plate and several storage bins for food, one of said food bins or boxes adapted to maintain a supply of food in position over a heating means and near the opening through which the food is removed for use.

Another object of my invention is the purpose of an ice box for vending carts of this character which extends through the housing of the cart and may be filled or supplied with ice from one side without disturbing the food which is stored and made accessible through a door formed in the opposite side.

An even further object of the instant invention is to provide a combination steam table and storage box, beneath which is disposed an ice box, all of which is mounted within a mobile housing having many other novel features more fully hereinafter set forth in the specification referring to the accompanying drawings, in which:

Fig. 5 is yet another vertical cross section of the cart taken on line V—V of Fig. 1.

Fig. 6 is a horizontal section taken on line VI—VI of Fig. 1.

Fig. 7 is an enlarged detail sectional view of the handle locking means taken on line VII—VII of Fig. 6, and Fig. 8 is a front view of the vending cart.

Figure 1:
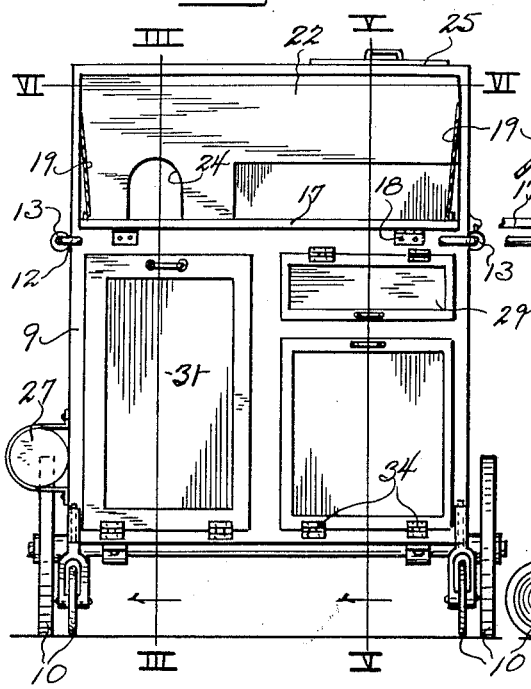
Figure 1 is a back view of a vending cart made in accordance with my invention.
Figure 2:
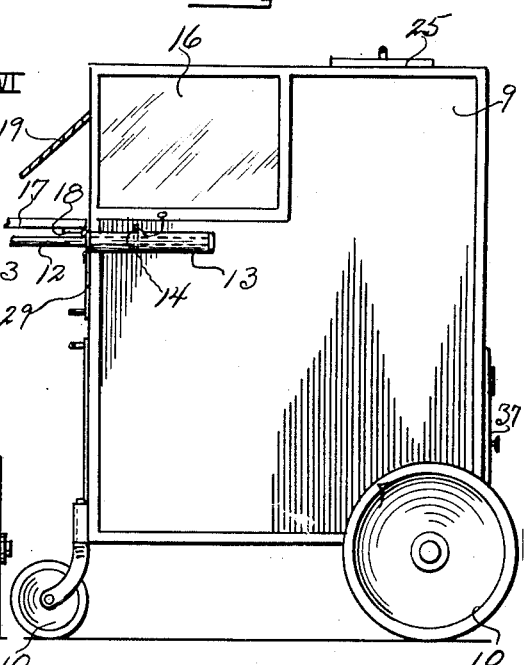
Fig. 2 is a side view of the same.
Figure 3:
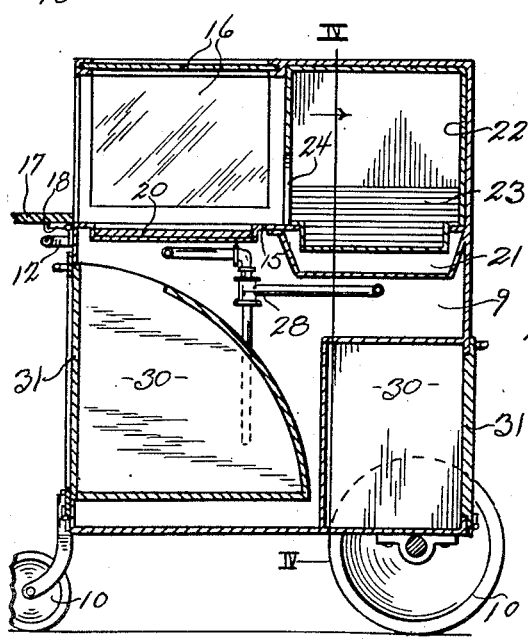
Fig. 3 is a vertical cross section through the cart taken on line III—III of Fig. 1.
Figure 4:
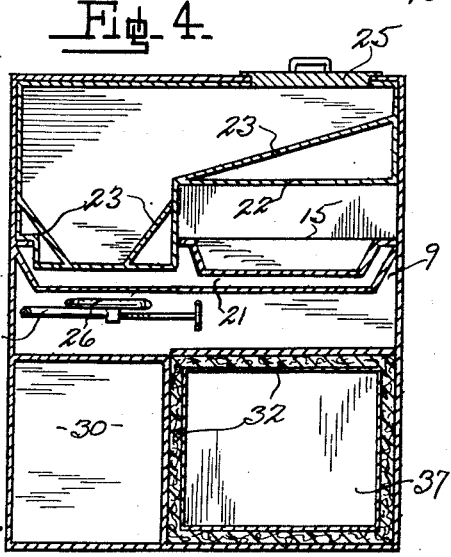
Fig. 4 is another vertical section through the housing of the vending cart, wheels removed, showing the novelly constructed food storage and heating box.

Similar reference characters refer to like parts throughout the several views, and the numeral 9 designates a housing which is mounted on wheels 10 and which is equipped with a handle 12, slidably mounted as shown to be pulled out when in use and to be pushed back to the position shown in dotted lines (Fig. 6) when in the closed position, or when the cart is not being wheeled about from place to place. The means for so mounting the handle 12 may be a barrel 13, rigidly secured to the opposite sides of housing 9 in such a way that the two side arms of handle 12 pass therethrough. A pin 14 may pass through registered openings in both handle arm and barrel 13 when the handle is pulled out to the operative position.

The housing 9 may be made of sheet metal or other suitable material, and should be divided into an upper and a lower compartment by a horizontal partition 15. A portion of housing 9 above this partition and toward the back part may be glass panelled as at 16 and a portion 17 of one wall hinged as at 18 to permit access to the later described parts disposed above partition 15. This portion 17 drops from the vertical to the horizontal position when positioned for use, and may be supported by any suitable means such as flexible cables or chains 19.

This compartment above partition 15 and in the rear of the housing 9 is the working space, and a hot plate 20 is formed in any suitable manner to be used in cooking the raw materials stored in a later described ice box positioned below the partition or in the lower compartment of the housing. A water pan 21 is formed integrally with partition 15 at one corner of the same into which projects a lower part of a food box 22, held securely in place above the partition. As shown, a space is present between the walls of the food box and the water pan, and angled plates 23, built in box 22, maintain any food that might be stored in box 22 at or near the lower portion. An opening 24 formed in the side wall of box 22 enters the same at a point where the food is maintained by plates 23, and insures reaching desirable food first.

This construction of a food box creates a steam table which keeps buns or the like in a warm moist condition. A filler door 25 may be provided at any suitable place to supply box 22.

Pan 21 and hot plate 20 are both kept hot through the use of suitable burners or other heating elements 26 and a burner is disposed beneath each to permit independent operation. A fuel supply tank 27 is carried by housing 9, and suitable pipes or conduits 28 connect the same with each burner 26. A door 29 is provided through which the operator may reach into the lower compartment to adjust either burner 26. The burners are, as illustrated, below partition 15 within the lower compartment with other food storage bins 30, any number of which may be constructed with doors 31 to keep them closed.

It is to be noted, these doors may be hingedly mounted on the sides of the housing in any desired manner.

As a highly important feature of the invention, the lower compartment beneath partition 15 is equipped with an ice box, formed by insulated walls 32 which extend entirely through housing 9 from the front to the back sides. These insulated walls hold the cold in and keep the heat from burners 26 from reaching perishable food to spoil it.

A swinging meat or food container 33 is hingedly mounted as at 34 to swing into and out of the back portion of the ice box which may be set off from the front part by a partition 35 adapted to permit proper circulation and also adapted to keep ice 36 from interfering with the movement of container 33. A door 37 in the front wall allows the filling of the ice box without removing food container 33.

The uses to which the vending cart may be put are many, but it is desired to keep buns in bin 22, fresh meat to be cooked on plate 20, in container 33 and additional supplies in any other food chambers 30 it is deemed desirable to use. The glass portion of the housing keeps the cooking compartment sanitary, yet allows clear vision.

It is understood that many modifications in construction may be made without departing from the spirit of the invention or the scope of the appended claim.

What I claim and desire to secure by Letters Patent is:

In a vending cart of the class described, a housing, a horizontal partition supported within the housing, a water pan formed by said partition, a heating means positioned below said partition to heat said water pan, a food storage box having opposite downwardly converging sides and opposite parallel sides disposed above said horizontal partition having an offset portion adapted to project into said pan and means within said box for maintaining stored food within said offset portion.

In testimony whereof I hereunto affix my signature.

FRANCES E. COFFEY.